US006368529B1

(12) United States Patent
Lloyd et al.

(10) Patent No.: US 6,368,529 B1
(45) Date of Patent: Apr. 9, 2002

(54) LIGNOCELLULOSIC COMPOSITE

(75) Inventors: Jeffrey D. Lloyd, Valencia; Mark J. Manning, Santa Monica; Frederick M. Ascherl, Palmdale, all of CA (US)

(73) Assignee: U.S. Borax Inc., Valencia, CA (US)

( * ) Notice: Subject to any disclaimer, the term of this patent is extended or adjusted under 35 U.S.C. 154(b) by 0 days.

(21) Appl. No.: 09/571,147

(22) Filed: May 14, 2000

(51) Int. Cl.[7] .......................... A01N 59/14; B27K 3/18; B27N 3/10

(52) U.S. Cl. .......................................... 264/109; 524/14

(58) Field of Search ............................. 264/109; 524/14

(56) References Cited

U.S. PATENT DOCUMENTS

| | | | | |
|---|---|---|---|---|
| 629,861 A | | 8/1899 | Konrad | |
| 4,076,580 A | | 2/1978 | Panusch et al. | |
| 4,126,473 A | | 11/1978 | Sobolev et al. | |
| 4,352,719 A | | 10/1982 | Herr | |
| 4,363,798 A | | 12/1982 | D'Orazio | |
| 4,879,083 A | | 11/1989 | Knudsen et al. | |
| 4,935,457 A | * | 6/1990 | Metzner et al. | 524/14 |
| 5,246,652 A | * | 9/1993 | Hsu et al. | 264/109 |
| 5,549,739 A | * | 8/1996 | Inoue et al. | 524/55 |
| 5,763,338 A | | 6/1998 | Sean | |

FOREIGN PATENT DOCUMENTS

| | | |
|---|---|---|
| DE | 3537241 A1 | 4/1987 |
| DE | 3805819 A1 | 9/1988 |
| JP | 62-275703 A | 11/1987 |
| JP | 63-137802 A | 6/1988 |
| JP | 63-159006 A | 7/1988 |
| JP | 63-135599 A | 9/1988 |
| JP | 63-237902 A | 10/1988 |
| JP | 06-155412 A | 6/1994 |
| WO | WO 00/09326 | 2/2000 |

OTHER PUBLICATIONS

Thomas H. Daniels and Douglas P. Krapas, "Combustion Characteris–tics of Zinc Borate–Impregnated OSB Wood Waste in an Atmospheric Fluidized Bed", 32nd International Particleboard/Composite Materials Symposium Proceedings, Washington State University, Pullman, Washington, Mar. 31–Apr. 2, 1998, p. 167 (Abstract).

Thomas H. Daniels and Douglas P. Krapas, "Combustion Characteris–tics of Zinc Borate–Impregnated OSB Wood Waste in a Fluidized Bed Combustion System", 32nd International Particleboard Composite Materials Symposium Proceedings, Mar. 31–Apr. 2, 1998, Energy Products of Idaho, pp. 1–11.

Trek Sean, Giles Burnette, and Francine Cote, "Protection of Oriented Strandboard with Borate", Forest Product Journal, vol. 49, No. 6, Jun. 1999, pp. 47–51.

Peter E. Laks and Mark J. Manning, "Inorganic Borates as Preserva–tive Systems for Wood Composites", Second Pacific Rim Bio–Based Composites Symposium, Vancouver, Canada, Nov. 6–9, 1994, pp. 236–244.

Peter E. Laks and Mark J. Manning, "Preservation of Wood Composites with Zinc Borate", International Research Group on Wood Preserva–tion, 26th Annual Mtg, Helsinger, Denmark, Jun. 11–16, 1995, pp. 1–12.

Peter E. Laks and Mark J. Manning, "Update on the Use of Borates as Preservatives for Wood Composites", Proceedings of the Second International Conference on Wood Protection with Diffusible Pre–servatives and Pesticides, pp. 62–68, Forest Products Society, Madison, Wisconsin (1997).

J.R. Johanson, "Bulk Solids Indices Testing—Hang–up Indicizer Instruction Manual", 1991.

J.R. Johanson, "Bulk Solids Indices Testing—Hopper Indicizer Instruction Manual", 1991.

JR Johanson, Inc., "Binside Scoop", vol. 7, No. 2, Fall 1994, pp. 1–2, 4.

JR Johanson, Inc., "Binside Scoop", vol. 8, No. 3, Winter 1995, pp. 2 4.

Jerry R. Johanson, "Bulk Solids Flow Indices—A Simplified Evaluation System", JR Johanson, Inc., 712 Fiero Lane #37, San Luis Obispo, CA 93401, pp. 1–2 (1991).

W. Young, "The Effect Of Lime On Clinker Formed In Furnaces Burning Boric Acid Impregnated Planar Shavings", Australian Timber Journal, vol. 12, No. 12, pp. 690, 693, 700, 701 (1947).

R. B. Donovan, "Choice of refractories of treated wood waste burners", NZ Timber Journal, May 2, 1966, pp. 42–43.

Sprague et al., "The use of boron products in cellulose insula–tion", Journal of Thermal Insulation, vol. 2, Apr. 1979, pp. 161–174.

Taubert et al., Chemical Abstracts, 85, 34930(1976).

Taubert et al., Chemical Abstracts, 87, 169499(1977).

Chemische Fabrik Kalk GmbH., Chemical Abstracts, 89, 94230(1977).

Sprague et al., Chemical Abstracts, 92, 43489(1979).

Kataflox Patentvervaltungs G.m.b.H., Chemical Abstracts, 92, 115446(1979).

Kataflox Patentvervaltungs G.m.b.H., Chemical Abstracts, 92, 133957(1979).

(List continued on next page.)

*Primary Examiner*—Mary Lynn Theisen
(74) *Attorney, Agent, or Firm*—Kurt R. Ganderup; James R. Thornton

(57) ABSTRACT

Lignocellulosic-based composite products containing a pesticidal amount of calcium borate is resistant to attack by wood destroying fungi and insects. The preferred calcium borates are the calcium polytriborates having a $CaO:B_2O_3$ molar ratio of about 2:3 and calcium hexaborates, having a $CaO:B_2O_3$ ratio of 1:3. Composites can be produced by combining the calcium borate with particles of the lignocellulosic material and an adhesive resin, and forming the composite, generally with heat and pressure.

23 Claims, No Drawings

OTHER PUBLICATIONS

Sobolov et al., Chemical Abstracts, 94, 49097(1980).
Herr, Alfons K., Chemical Abstracts, 95, 117374(1981).
Herr, Alfons K., Chemical Abstracts, 95, 152447(1981).
Taubert, Rainer, Chemical Abstracts, 95, 221614(1981).
Taubert et al., Chemical Abstracts, 97, 94323(1982).
Taubert, Rainer, Chemical Abstracts, 99, 40094(1983).
Herr, Alfons K., Chemical Abstracts, 102, 206153(1985).
Oestman, Birgit A. L,, Chemical Abstracts, 103, 38898(1994).
Herr et al., Chemical Abstracts, 106, 104112(1986).
Sugiura et al., Chemical Abstracts, 108, 136813(1988).
Ota et al., Chemical Abstracts, 109, 192457(1988).
Nakai et al., Chemical Abstracts, 109, 206767h(1988).
Nekota, Takashi, Chemical Abstracts, 129, 71147(1998).
Meisei et al., Derwent World Patent Index Abstract, JP 60155565 A (1985).
Jansen, W., Derwent World Patent Index Abstract, DE 3206218 A (1983).
Inorganic Chemistry Inst., Derwent World Patent Index Abstract, SU 283546, WPI Acc. No. 71–45842s/27(1971).
Matsushita Elec. Works, Derwent World Patent Index Abstract, JP 63179810, WPI Acc. No. 88–246688/35(1988).

* cited by examiner

LIGNOCELLULOSIC COMPOSITE

This invention relates to composites and more particularly, this invention relates to lignocellulosic-based composite products which are resistant to insect and fungal attack.

BACKGROUND OF THE INVENTION

Due to recent changes in the species, size and quality of standing timber available for harvest throughout the world, composites of lignocellulosic materials have replaced traditional solid sawn lumber for use in many structural applications. Many of these composites are used in applications which require resistance to wood-destroying organisms such as fungi and various insects. Accordingly, this requires treatment with a wood preservative.

Traditionally, solid wood products are dipped or pressure treated with solutions of preservative chemicals. However, the nature of a composite material makes it possible to incorporate a preservative into the product during its manufacture. This decreases total production costs and yields a superior product in which the composite has a constant loading of preservative throughout its thickness.

Borates have been used as broad-spectrum wood preservatives for over 50 years. Their benefits include efficacy against most wood destroying organisms such as fungi, termites and wood-boring beetles. Coupled with their low acute mammalian toxicity and low environmental impact, their fungicidal and insecticidal properties have resulted in them being considered the wood preservative of choice for most structural or construction applications. Borates such as boric acid, borax, disodium octaborate tetrahydrate (sold as TIM-BOR® wood preservative, a product of U.S. Borax Inc.) and, more recently, zinc borate are well accepted as wood preservatives. Generally, boric acid, borax and disodium octaborate are used for treating solid, wood products by dip or pressure treatment. However, these preservatives are readily soluble in water and can be incompatible with many resin systems used in producing composite products, resulting in an adverse effect on the internal bond strength of the resultant composites and poor mechanical strength. Anhydrous borax and zinc borate have been used successfully at relatively low levels with some resin systems, such as the phenol-formaldehyde resins, to produce composites with acceptable internal bond strength. See Knudson et al., U.S. Pat. No. 4,879,083. Although the low solubility borates of Knudson et al, especially zinc borate, have been used successfully to treat wood composites such as oriented strand board (OSB), fiberboard, waferboard and particleboard, they suffer from several problems in actual commercial use. For example, in working with composites containing zinc borate, metal tools, such as saws, grinders and similar cutting tools may suffer significant wear and premature failure due to the borate's hardness. Also, the disposal of treated wood products by combustion can lead to problems in operating performance and maintenance of furnaces. It has also been found that particulate zinc borate used to treat wood composites has poor bulk flow properties which can cause difficulties in the wood composite manufacturing process.

The increased demand for treated wood composite products has resulted in a large volume utilization of borates in high capacity wood composite manufacture. Due to the very high volume throughput of commercial wood composite manufacturing facilities combined with the practice that waste wood is utilized as an energy source for wood particle drying as part of the process, an excessive build up of glassy borate deposits can occur within the furnaces. This will reduce the operating performance of the furnace as well as corrode the refractories of the furnace. In addition, the glassy borate deposits can be very difficult to remove from the furnace. See Daniels and Krapas, "Combustion Characteristics of Zinc Borate-Impregnated OSB Wood Waste in an Atmospheric Fluidized Bed," $32^{nd}$ *International Particleboard/Composite Materials Symposium Proceedings*, Mar. 3–Apr. 2, 1998, page 167 (1998).

This invention provides composites made from wood and other lignocellulosic materials which are resistant to attack by wood destroying organisms such as fungi and insects, have excellent internal bonding strength and may readily be cut, sawn and machined without excessive wear to the tools. Further, trimmings and other waste from manufacture and use of the treated composites may be disposed of by combustion without significant problems such as clogging and deterioration of the furnaces.

BRIEF DESCRIPTION OF THE INVENTION

According to this invention, a pesticidal amount of a calcium borate is incorporated prior to forming a lignocellulosic-based composite, thereby producing composites which are resistant to insect and fungal attack.

DETAILED DESCRIPTION OF THE INVENTION

The lignocellulosic-based composites of this invention are produced by well known procedures by combining particles of the lignocellulosic material with an adhesive binder and forming the composite, generally with heat and pressure. The calcium borate is incorporated, such as by adding to the lignocellulosic particles and/or binder, prior to forming the composite. The calcium borates are considered to have a low impact on the environment, with low mammalian toxicity, resulting in relatively safe use and disposal. They are effective fungicidal and insecticidal compounds that are relatively inexpensive, easy to store, handle and use. For example, the calcium borates have much better flowability than many other similar borates. Further, the calcium borates have some water solubility, providing rapid and continuing pesticidal activity in composites subject to exposure to low moisture environments in uses such as structural siding.

Lignocellulosic-based composites are formed from small fractions of cellulosic material, which are bonded with an adhesive binder, generally with heat and under pressure. The method of forming cellulosic-based composites is well known and has resulted in many products, including particleboard, oriented strand board (OSB), waferboard, fiberboard (including medium-density and high-density fiberboard), parallel strand lumber (PSL), laminated strand lumber (LSL), laminated veneer lumber (LVL), and similar products. Examples of suitable cellulosic materials include wood, straw (including rice, wheat and barley), flax, hemp and bagasse. The small fractions of cellulosic material can be in any processed form such as chips, flakes, fibers, strands, wafers, trim, shavings, sawdust, straw, stalks and shives.

The methods for manufacturing composites are well known and the specific procedure will be dependent on the cellulosic raw material and the type of composite desired. However, generally the cellulosic material is processed into fractions or particles of appropriate size, which may be called a furnish, mixed with an adhesive binder and the resultant mixture is formed into the desired configuration such as a mat, and then formed, usually under pressure and with heat, into the final product. The process could be considered an essentially dry process; that is, generally, no water is added to form a slurry of the materials (other than any water that may be used as a carrier for liquid resins).

The binder is preferably an adhesive resin which is cured with heat to give a strong bond between the cellulosic particles or fractions and provide structural composites with high mechanical strength. Such heat-cured adhesive resins are well known and include the formaldehyde- and isocyanate-based resins. Phenol-formaldehyde, phenol-resorcinol-formaldehyde, urea-formaldehyde, melamine-urea-formaldehyde and diphenylmethanediisocyanate are examples of suitable heat-cured resins in current use. The preferred levels of binder can typically range from about 1.5% to about 15%, but may be as low as 0.5% or as high as 25%for some composites, depending on a variety of constraints such as the particle size of the furnish and the strength and durability required of the finished wood composite. For example, structural quality OSB would typically contain between about 1.5% and 7% binder, whereas structural quality particle board may require up to 15 to 20% binder or more and medium density fiberboard (MDF) with low strength and durability requirements, such as pegboard, may contain less than 1%. Unlike many borates that have been used in the past to preserve cellulosic-based composites, the calcium borates of the present invention may be used successfully, without adverse effect on the binder or on the mechanical strength of the composite product.

The calcium borates which can be used in the method of this invention may be any of the borate compounds containing calcium, boron and oxygen. Optionally, other metallic elements, such as magnesium and sodium, may also be a part of the calcium borate molecule, i.e. calcium-sodium borates and calcium-magnesium borates. The preferred calcium borates are the calcium polytriborates, having a $CaO:B_2O_3$ ratio of 2:3, and calcium hexaborates, having a $CaO:B_2O_3$ ratio of 1:3, with the most preferred being the calcium polytriborates. Such calcium polytriborates may be synthetically produced or may be a naturally occurring borate, such as inyonite, meyerhofferite and colemanite. Examples of suitable calcium hexaborates include nobleite and gowerite. Calcium-sodium borates and calcium-magnesium borates include probertite, ulexite and hydroboracite.

The particle size of the calcium borate is not critical, but should obviously be of a size that can be readily dispersed throughout the composite product. Generally, a mean particle size of as large as about 500 microns and as small as about 1 micron may be used, but for best results, it is preferred that the particle size be in the range of from about 150 microns to about 10 microns.

The amount of calcium borate incorporated in the composite is a pesticidal amount; that is, an amount sufficient to control or kill fungi and/or insects that destroy wood and similar cellulosic-based composites products. Generally, a range of from about 0.1 to about 4 percent by weight of calcium borate, based on the composite product is used to control pests. The amount used will depend on the target pests, desired performance longevity and the expected level of precipitation exposure. Preferably, from about 0.5 to about 2 percent is used for optimum performance against both decay fungi and termites.

The calcium borate may be incorporated in the composite in any manner that will result in dispersion throughout the final product. In the case of wood-based composites, it may be mixed with the wood particles, or furnish, prior to mixing with the resin or it may be added to the resin or wood-resin mixture and then formed into a mat for pressing, heating and curing to produce the final composite. Preferably, the calcium borate is evenly distributed on wood particles such as chips or strands in order to ensure maximum contact between the wood particles and the preservative, then the resin is applied and the wood furnish is spread evenly onto plates or an endless belt (conveyor belt), forming a mat to be pressed into its final thickness. Heat is applied to cure the resin and form the final composite product. The wood furnish may contain optional amounts of additives, such as slack wax or flow agents, if desired, to aid in processing or performance, but are not essential.

EXAMPLES

Example 1

Wood flakeboard was manufactured by conventional wood processing techniques, incorporating various borates at a range of concentrations, from 0.5 to 2.0% boric acid equivalent (BAE). Boric acid ($H_3BO_3$) equivalent is a commonly used convention for comparing various borates on an equivalent contained-boron basis. For each borate/loading combination, fifteen pounds of aspen (*Populus tremuloides*) furnish having an average particle size of about 2.5×0.75×0.025 inches, was blended with 0.75 pounds (5%) Rubinate 1840 (product of ICI), a polymeric methylene diphenyl diisocyanate adhesive, 0.11 pounds (0.75%) of Cascowax EW 403HS (product of Borden) and various concentrations of nine test borates. For each borate/loading combination, three 18"×18" composite boards of 0.5 inch thickness were formed by pressing for 210 seconds at (180 seconds pressure, 30 seconds pressure release) at 204.5° C. (the pressure was kept in excess of 6000 psi during the pressure cycle). Each board was trimmed to 15"×15" and cut to produce internal bond and analytical/soil block specimens for evaluation. Replicates were cut from the inner portion of the boards. Four internal bond, two leaching panels and twenty analytical/soil block specimens were cut from each board.

The panels to be leached (4.5"×4.5") were edge sealed with an epoxy sealant and leached for two weeks. Leaching began with pressure treatment of the specimens with water for 30 minutes under vacuum and one hour under pressure. The specimens were removed from the pressure treatment chamber and the residual water was changed after two hours, then daily for the remainder of the leaching period. Afterward, they were trimmed to remove the sealed edges and cut into analytical/soil block test samples. Unleached and leached analytical/soil block samples for each board type were separately randomized. Fifteen were analyzed for borate content and ten were retained for the soil block decay test.

Dry internal bond, a measure of bonding strength, was determined in accordance with ASTM Standard D1037. The test data showed that the various borates had little or no effect on the internal bond of the test panels.

The soil block test was conducted in accordance with AWPA E10-87, with the exception that soil block dimensions were 1.0"×1.0"×0.5". The fungi used were *Gloeophyllum trabeum* (ATCC 11539) for brown rot test and *Trametes versicolor* (MAD 697) for white rot test. An untreated composite control was run both unleached and leached. Solid southern yellow pine and birch were also run as unleashed controls against *G. trabeum* and *T. versicolor*, respectively as a test of fungal vigor.

The following results were obtained:

TABLE 1a

SOIL BLOCK TEST RESULTS
Target Loading - 0.5% BAE (0.09% B)

| | | UNLEACHED | | | LEACHED | | |
|---|---|---|---|---|---|---|---|
| | Active | | Mean % Wt. Loss | | | Mean % Wt. Loss | |
| Active Ingredient* | Ingredient (% Added) | Assay % B | G. trabeum | T. versicolor | Assay % B | G. trabeum | T. versicolor |
| Ulexite | 0.77 | 0.09 | 1.4 | 13.9 | 0.03 | 6.6 | 22.3 |
| Colemanite (1) | 0.66 | 0.10 | 0.6 | 3.9 | 0.03 | 5.5 | 27.5 |
| Colemanite (2) | 0.66 | 0.09 | 0.8 | 5.1 | 0.04 | 3.4 | 19.9 |
| Nobleite | 0.45 | 0.09 | 1.1 | 5.3 | 0.03 | 5.4 | 27.6 |
| Hydroboracite | 0.48 | 0.09 | 1.1 | 2.8 | 0.05 | 9.4 | 27.1 |
| Gowerite | 0.47 | 0.11 | 0.9 | 5.5 | 0.04 | 7.4 | 24.7 |
| Zinc Borate | 0.58 | 0.10 | 0.9 | 8.3 | 0.05 | 2.3 | 22.9 |
| Boric Oxide (60m) | 0.29 | 0.07 | 1.6 | 7.6 | 0.02 | 8.0 | 50.4 |
| Boric Oxide (4m) | 0.29 | 0.09 | 2.6 | 7.5 | 0.02 | 15.5 | 34.3 |
| Untreated Aspen | 0 | — | 24.5 | 53.2 | — | 16.9 | 51.4 |
| Untreated SSYP | 0 | — | 37.6 | — | — | — | — |
| Untreated SB | 0 | — | — | 64.6 | — | — | — |

TABLE 1b

SOIL BLOCK TEST RESULTS
Target Loading - 1.0% BAE (0.17% B)

| | | UNLEACHED | | | LEACHED | | |
|---|---|---|---|---|---|---|---|
| | Active | | Mean % Wt. Loss | | | Mean % Wt. Loss | |
| Active Ingredient* | Ingredient (% Added) | Assay % B | G. trabeum | T. versicolor | Assay % B | G. trabeum | T. versicolor |
| Ulexite | 1.56 | 0.18 | 0.8 | 3.4 | 0.08 | 1.0 | 11.0 |
| Colemanite (1) | 1.31 | 0.18 | 1.0 | 3.7 | 0.07 | 1.5 | 8.4 |
| Colemanite (2) | 1.31 | 0.15 | 0.6 | 2.3 | 0.08 | 1.6 | 5.1 |
| Nobleite | 0.91 | 0.16 | 1.0 | 3.6 | 0.06 | 1.4 | 11.6 |
| Hydroboracite | 0.96 | 0.11 | 1.0 | 3.6 | 0.06 | 4.2 | 21.0 |
| Gowerite | 0.96 | 0.18 | 0.9 | 3.1 | 0.07 | 5.8 | 14.7 |
| Zinc Borate | 1.17 | 0.17 | 0.8 | 2.9 | 0.10 | 0.9 | 7.0 |
| Boric Oxide (60m) | 0.58 | 0.13 | 0.7 | 3.6 | 0.03 | 6.0 | 35.8 |
| Boric Oxide (4m) | 0.58 | 0.10 | 1.4 | 9.0 | 0.04 | 7.4 | 29.5 |
| Untreated Aspen | 0 | — | 24.5 | 53.2 | — | 16.9 | 51.4 |
| Untreated SSYP | 0 | — | 37.6 | — | — | — | — |
| Untreated SB | 0 | — | — | 64.6 | — | — | — |

TABLE 1c

SOIL BLOCK TEST RESULTS
Target Loading - 2.0% BAE (0.35% B)

| | | UNLEACHED | | | LEACHED | | |
|---|---|---|---|---|---|---|---|
| | Active | | Mean % Wt. Loss | | | Mean % Wt. Loss | |
| Active Ingredient* | Ingredient (% Added) | Assay % B | G. trabeum | T. versicolor | Assay % B | G. trabeum | T. versicolor |
| Ulexite | 3.06 | 0.35 | 1.8 | 3.0 | 0.11 | 1.3 | 7.2 |
| Colemanite (1) | 2.62 | 0.29 | 1.5 | 2.4 | 0.19 | 1.0 | 2.5 |
| Colemanite (2) | 2.62 | 0.31 | 1.1 | 2.2 | 0.18 | 1.3 | 2.2 |
| Nobleite | 1.82 | 0.33 | 1.4 | 2.6 | 0.09 | 1.5 | 10.1 |
| Hydroboracite | 1.92 | 0.25 | 2.2 | 2.2 | 0.13 | 1.8 | 4.5 |
| Gowerite | 1.91 | 0.24 | 1.3 | 2.6 | 0.09 | 3.1 | 11.8 |
| Zinc Borate | 2.34 | 0.31 | 1.0 | 1.6 | 0.23 | 0.8 | 2.0 |
| Boric Oxide (60m) | 1.16 | 0.31 | 1.1 | 3.7 | 0.07 | 3.3 | 23.2 |
| Boric Oxide (4m) | 1.16 | 0.26 | 1.7 | 2.9 | 0.09 | 3.0 | 9.5 |
| Untreated Aspen | 0 | — | 24.5 | 53.2 | — | 16.9 | 51.4 |

TABLE 1c-continued

SOIL BLOCK TEST RESULTS
Target Loading - 2.0% BAE (0.35% B)

| | | UNLEACHED | | | LEACHED | | |
|---|---|---|---|---|---|---|---|
| | Active | | Mean % Wt. Loss | | | Mean % Wt. Loss | |
| Active Ingredient* | Ingredient (% Added) | Assay % B | G. trabeum | T. versicolor | Assay % B | G. trabeum | T. versicolor |
| Untreated SSYP | 0 | — | 37.6 | — | — | — | — |
| Untreated SB | 0 | — | — | 64.6 | — | — | — |

*Colemanite (1) grade - 42.9% $B_2O_3$ (Glass Grade)
Colemanite (2) grade - 37.8% $B_2O_3$
Boric Oxide (60m) - 60 mesh
Boric Oxide (4m) - 4 mesh
SSYP - solid southern yellow pine
SB - solid birch As the above results show, the calcium borates were generally effective at controlling *Gloeophyllum trabeum* and *Trametes versicolor*, and the calcium polytriborate, (Colemanite (1) and (2)), was roughly comparable to zinc borate in the tests against both types of fungi after leaching. However, as pointed out above, the calcium borates have several advantages over zinc borate, such as in the combustion of waste wood products, as illustrated in Example 2, below.

Example 2

Aspen wafer oriented strand board (OSB) bonded with polymeric methylene diphenyl diisocyanate adhesive resin was prepared according to the procedure of Example 1 with boric oxide ($B_2O_3$), calcium polytriborate and zinc borate as borate additives. The test boards had a thickness of about 13 mm and test samples were chosen to have a loading of 1.8% boric acid equivalent, on a dry weight basis. The test boards were sawn into sections of approximately 20 mm×100 mm and then burned in approximately 100 g. sample sizes in a platinum crucible in a furnace. The temperature was ramped up from 0 to 800° C. in hourly 200° C. intervals, and then at 100° C. intervals to 1000° C. Specific observations were made over this period, with particular attention being given to 600, 800, 900, and 1000° C. as being those known to be encountered in commercial high temperature wood burning furnaces. Weight of the remaining char after 8 hours combustion was also recorded.

All samples burned and reasonably maintained their original form, but were reduced in size and turned totally to a black char mass. Mass loss then continued, probably as $CO_2$.

The board containing boric oxide produced a transparent liquid exudate, at approximately 600° C. from the remaining char. At 800° C. it continued to be produced and stuck to the sides of the crucible in glassy-like sticky deposits, a problem that continued over the higher temperatures tested. At the end of the burn, the remaining ash and char mass was difficult to break up and difficult to remove from the crucible. The crucible was also almost completely lined with a thin glaze.

The zinc borate-containing board produced exactly the same transparent liquid glass-like exudate, although this did not occur until a temperature of about 800° C. was reached, and appeared most dramatic at 900° C. At the end of the burn, the remaining ash and char mass was difficult to break up and very difficult to remove from the crucible. A white powder deposit was also found around the rim of the crucible and this was found to be zinc oxide that must have been deposited from a volatile phase.

The calcium borate containing board was dissimilar to the other two borates tested. At 800° C. a fine white ash appeared at the surface of char mass, and this replaced the liquid exudate seen with the other borates during the burn. At the end of the burn, the remaining ash and char mass was easy to break up and to remove from the crucible.

The results are summarized in the following Table 2.

TABLE 2

| | ADDITIVE | | |
|---|---|---|---|
| Observations at | Boric Oxide | Zinc Borate | Calcium Borate |
| 600° C. | Glassy exudate | Char only | Char only |
| 800° C. | Glassy exudate sticking to sides | Glassy exudate | Char and white ash |
| 900° C. | Glassy exudate sticking to sides | Glassy exudate sticking to sides | Char and white ash |
| 1000° C. | Glassy exudate sticking to sides | Glassy exudate sticking to sides and white powder powder deposit | Char and white ash. Slight glassing |
| Ash and Char characteristics | Glassy Ash and solid charcoal. Difficult to remove from crucible. Crucible also thinly glass lined | Glassy Ash and solid charcoal. Difficult to remove from crucible. | Loose ash and charcoal |

It is apparent that the three different borates have the ability to form a glassy phase but that this is temperature dependent. At normal furnace operating temperatures (600°–900° C.) both the boric oxide and the zinc borate are known to cause problems with combustion zone lining, combustion air injection and ash removal. Yet, at these temperature, it was shown that the use of the calcium borate would alleviate all three of the major problems.

Other beneficial uses for waste wood products containing calcium borate include grinding to small particles and using as a boron supplement in agricultural plant foods, or as a mulch in landscaping. The residual calcium borate will contribute the micronutrient boron as well as provide a small amount of alkali as calcium. Waste wood products containing zinc borate cannot easily be used in such boron fertilizer applications because of the higher potential for phytotoxicity by the zinc.

An additional advantage of producing composite wood products with the calcium borate additives in place of conventionally used zinc borate is that the calcium borates have much better flow properties, making them easier to store and handle in processing equipment. The following example compares the flow properties of zinc borate with representative calcium borates, including nobleite, synthetic calcium hexaborate, and colemanite, naturally occurring calcium polytriborate in the form of a processed ore. Colemanite F is a grade containing 37.8% $B_2O_3$ and Colemanite, Glass Grade a grade that contains 42.9% $B_2O_3$.

Example 3

Bulk solids flow testing was done using the J. R. Johanson Indicizer System, including a Hang-up Indicizer and Hopper Indicizer, manufactured by J R Johanson, Inc. 712 Fiero Lane #37, San Luis Obispo, Calif. 93401. The test procedures are described in detail in their company literature (BULK SOLIDS INDICES TESTING, Hang-up Indicizer™ Instruction Manual ©JR Johanson, Inc. 1991 and BULK SOLIDS INDICES TESTING, Hopper Indicizer™ Instruction Manual ©JR Johanson, Inc. 1991). The results are presented in the following Table 3 as the Arching Index, Ratholing Index, Hopper Index and Chute Index, which are the average of several tests (3–6). The meaning and usefulness of these flow indices in evaluating the flow properties of bulk solids are also described in literature from JR Johanson, Inc., including Binside Scoop™, Vol. 7, No. 2, Fall 1994, Binside Scoop™, Vol. 8, No. 3, Winter 1995, and “Bulk solids Flow Indices—A Simplified Evaluation system”, by Jerry R. Johanson, ©JR Johanson, 1991.

Arching Index—A tendency of a cohesive material is to plug up the opening of a bin by forming an “arch” over the discharge opening. The arching index is given as a multiple of the discharge opening, so less than 1 is necessary for free flow. Numbers greater than 1 reflect a need to enlarge the opening.

Ratholing Index—A tendency of a cohesive material is to hang up on the sides of a bin while an open hole forms in the center and flow ceases. Rathole indices are also given as a multiple of the discharge opening and a number of less than 1 is necessary for free flow. Numbers greater than 1 mean the bins should be redesigned.

Hopper Index—The maximum angle, measured in degrees from the vertical, that is required for the conical portion of a hopper in order to produce reliable mass flow. A larger number is better.

Chute Index—The minimum angle, measured in degrees from horizontal, required for flow down a chute and to prevent material buildup at impact areas. A smaller number is better. Chute indices may often be close to the angle of repose.

Both hopper and chute indices measurements involve friction over a specified surface and measurements are made using substrates of the material of construction. The substrates used for these tests are 304-2B Stainless Steel, aged carbon steel and Tivar UHMWPE (ultra high molecular weight polyethylene) plastic.

TABLE 3

| | Nobleite | Colemanite F | Colemanite, Glass Grade | Zinc Borate |
|---|---|---|---|---|
| Arching Index | 0.2 | 0.4 | 0.7 | 0.5 |
| Ratholing Index | 0.5 | 3.9 | 4.7 | 2.9 |
| Hopper Index | | | | |
| Stainless Steel | 16 | 1.3 | 14 | 13 |
| Carbon Steel | 14 | 2.7 | 3 | 12 |
| Plastic | 17 | 4.2 | 8 | 13 |
| Chute Index | | | | |
| Stainless Steel | 45 | 90 | 76 | 38 |
| Carbon Steel | 47 | 90 | 82 | 44 |
| Plastic | 41 | 90 | 90 | 58 |

The above results show that the synthetic calcium hexaborate, nobleite, is preferred for superior flow properties, when compared with zinc borate and the finely ground naturally occurring calcium polytriborates (Colemanite F and Colemanite, Glass Grade).

Various changes and modifications of the invention can be made and to the extent that such changes and modifications incorporate the spirit of this invention, they are intended to be included within the scope of the appended claims.

What is claimed is:

1. In the method for forming lignocellulosic-based composite products which are resistant to insect and fungal attack, the improvement which comprises incorporating a pesticidal amount of a calcium borate prior to forming said composite product.

2. The method according to claim 1 in which said pesticidal amount is in the range of from about 0.1 to about 4 percent by weight of said composite product.

3. The method according to claim 1 in which said pesticidal amount is in the range of from about 0.5 to about 2 percent by weight of said composite product.

4. The method according to claim 1 in which said lignocellulosic material is selected from the group consisting of wood, flax, hemp, jute, bagasse and straw.

5. The method according to claim 1 in which said calcium borate is selected from the group consisting of calcium polytriborate, calcium hexaborate, calcium metaborate, calcium sodium borate and calcium magnesium borate.

6. The method according to claim 1 in which said calcium borate is combined with a furnish, a lignocellulosic material and a binder, and said composite product is formed with heat and pressure.

7. The method according to claim 6 in which a wood furnish is combined with said calcium borate and a heat cured adhesive resin, the resultant mixture is formed into a mat, and said mat is heated under pressure to form said composite product.

8. The method according to claim 7 in which said adhesive resin is selected from the group consisting of the formaldehyde- and isocyanate-based resins.

9. The method according to claim 8 in which said resin is selected from the group consisting of phenol-formaldehyde, phenol resorcinol formaldehyde, urea-formaldehyde and diphenylmethanediisocyanate.

10. The method according to claim 1 in which said calcium borate is a naturally occurring borate.

11. The method according to claim 10 in which said calcium borate is selected from the group consisting of nobleite, gowerite, hydroboracite, ulexite and colemanite.

12. The method according to claim 1 in which said calcium borate is a synthetic borate.

13. The method according to claim 12 in which said calcium borate is selected from the group consisting of calcium metaborate, calcium polytriborate and calcium hexaborate.

14. The method according to claim 1 in which said calcium borate is a calcium polytriborate having a $CaO:B_2O_3$ molar ratio of about 2:3.

15. The method according to claim 1 in which said calcium borate is a calcium hexaborate having a $CaO:B_2O_3$ molar ratio of about 1:3.

16. The method according to claim 15 in which said calcium hexaborate is nobleite.

17. The method according to claim 1 in which said lignocellulosic material is wood.

18. In the method for producing composite products by combining particles of lignocellulosic material with an adhesive resin and forming said composite with heat and pressure, the improvement which comprises incorporating a pesticidal amount of calcium borate prior to forming said composite product.

19. Composite lignocellulosic-based products having resistance to wood destroying insects and fungi containing a pesticidal amount of a calcium borate.

20. Composite products according to claim 19 in which said lignocellulosic material is wood.

21. Composite products according to claim 19 in which said calcium borate is a calcium polytriborate having a $CaO:B_2O_3$ molar ratio of about 2:3.

22. Composite products according to claim 19 in which said calcium borate is a calcium hexaborate having a $CaO:B_2O_3$ molar ratio of about 1:3.

23. A composite lignocellulosic-based product having resistance to insect and fungal attack, produced by the method according to claim 1.

* * * * *